Jan. 19, 1965 MASAO TAKAHASHI ETAL 3,165,812

METHOD OF MANUFACTURING GLASS DIODES

Filed Sept. 27, 1961

INVENTORS
MASAO TAKAHASHI
KYOJI SATO
ITARU YASUE

BY

Fisher, Christen & Sabol 3,165,812
METHOD OF MANUFACTURING GLASS DIODES

Masao Takahashi, Setagaya-ku, and Kyoji Sato and Haru Yasue, Kawasaki-shi, Japan, assignors to Tokyo Shibaura Electric Co., Ltd., Kawasaki-shi, Japan, a corporation of Japan Filed Sept. 27, 1961, Ser. No. 141,084
1 Claim. (Cl. 29—25.3)

The present invention relates to a method of manufacturing glass diodes and particularly to an improvement of the sealing procedure as a final stage of such method.

The present invention has for its object to provide a novel method of manufacturing glass diodes particularly with respect to the final sealing stage of the diode manufacture, which enables highly efficient mass production of glass diodes on an automatic machine which is easy to operate and simple in construction, while ensuring a proper contacting pressure between the contact element and the semiconductor metal pellet and holding the free end of the contact element in proper contacting position relative to the semiconductor pellet thereby to furnish products having uniform characteristics.

The above and other objects, features, and advantages of the present invention will be apparent from the following description when read with reference to the accompanying drawing which diagrammatically illustrates the manufacture of glass diodes according to the present invention.

Figure 1:
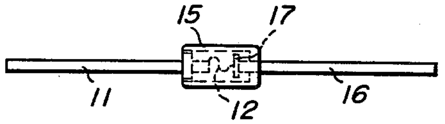
FIG. 1 is a front view of one example of glass diode which may be manufactured according to the present invention.
Figures 2, 3:
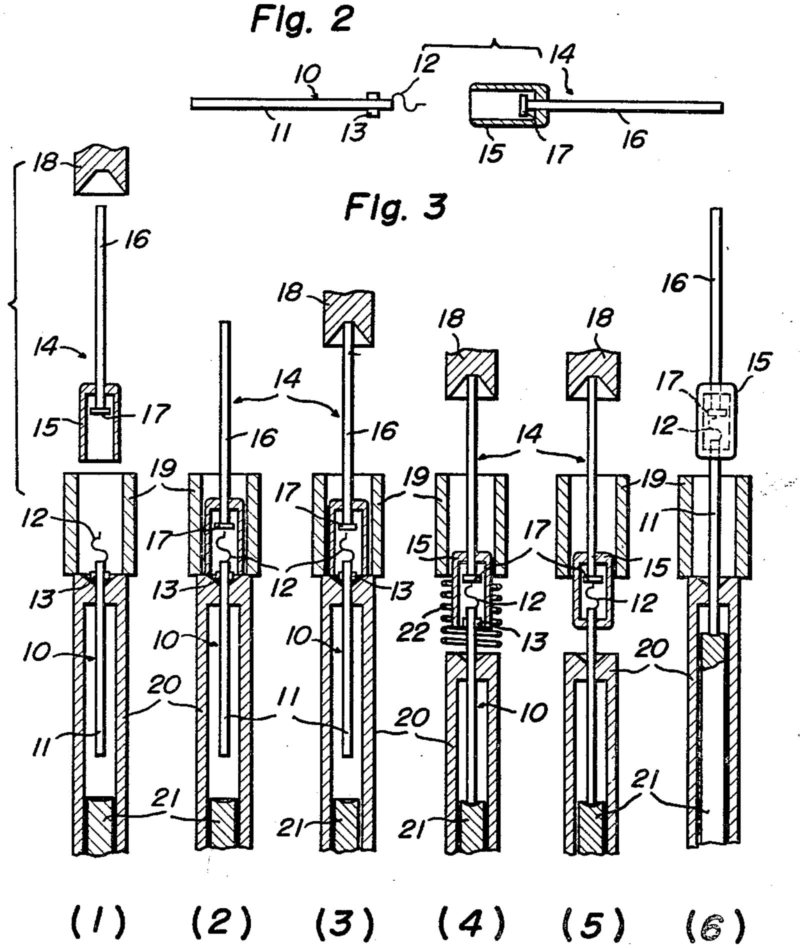
FIG. 2 is a front view, partly in section, of the two component members of the diode shown in FIG. 1, which are in aligned spaced-apart relation to each other preparatory to the final sealing stage of the diode manufacture.
FIG. 3 is a diagrammatic illustration of the successive stages of the inventive method which are carried out in the order from left to right as viewed in this figure.

A glass diode generally comprises a contact element and a semiconductor pellet connected with respective wire leads and sealed in a glass cylinder in contact with each other, for example as shown in FIG. 1. In the manufacture of such glass diode, two component members 10 and 14 are separately assembled as shown in FIG. 2 before entering the final stage of glass sealing.

One of the two component members 10 comprises a wire lead 11 carrying at one end a generally S-shaped and more or less resilient contact element 12 with a glass bead 13 secured to the wire lead at a point adjacent to the contact element. The other component member 14 comprises a wire lead 16 extending through and sealed to the bottom of a cup-shaped glass cylinder 15 with a semiconductor metal pellet 17 secured to that end of said wire lead which lies within the glass cylinder 15.

At the final sealing stage, the two component members are brought together so that the contact element 12 on the component member 10 is inserted into the glass cylinder with the free end of said contact element placed in contact with the end surface of the semiconductor pellet 17. Finally, the annular edge of the glass cylinder at the open end thereof and the glass bead 13 are heated and fused together to complete the sealing procedure.

In the sealing procedure of glass diodes of this kind, it is critical for obtaining products at all times uniform in characteristics to effect sealing in a manner such that the pointed end of the contact element 12 is held at all times in contact with the surface of the semiconductor pellet 17 at an appropriate point on the surface and that at a uniform contacting pressure.

It is not desirable, however, particularly in mass production of glass diodes on an automatic machine that the mechanism therein for supporting, loading and unloading as well as pressing together of the two components be complicated making the machine elaborate and difficult to operate, even if the sealing conditions as pointed out above be met.

One essential feature of the method according to the present invention is the unique arrangement in the sealing procedure of the diode members 10 and 14, one of which 10 having a contact element 12 is held vertical with the contact element disposed at the top while the other diode member 14 carrying a semiconductor metal pellet 17 is arranged above the diode member 10 in aligned relation thereto with the metal pellet disposed adjacent to the contact element. The two component members 10 and 14 thus arranged are brought together and heated to complete the sealing procedure as described later in further detail.

Referring particularly to FIG. 3, which diagrammatically shows an essential part of the apparatus for carrying out the sealing procedure according to the present invention, the apparatus comprises a presser weight 18 having a bottom surface formed with a conical recess, a stationary cylindrical tubular guide 19 arranged under said presser weight 18, a closed-top tubular supporting rod 20 disposed under said tubular guide 19 and having formed at the top end a recess and an axial bore in communication therewith, and a plunger abutment 21 vertically movable within said supporting rod 20, all of these components being arranged in vertical alignment with each other and vertically movable relative to each other except for the tubular guide 19.

The extreme left view (1) in FIG. 3 illustrates the two diode component members 10 and 14 as initially loaded on the sealing apparatus. The presser weight 18 is now positioned high above and preferably out of alignment with the other apparatus components to allow free loading of the diode members onto the apparatus. The support rod 20 is raised to its highest position until its top surface is in abutment with the bottom surface of tubular guide 19. Thereafter, the diode member 10 with its contact element 12 secured to the top end is inserted through the tubular guide 19 into the support rod 20 until the glass bead 13 secured to the wire lead adjacent to the contact element is received in the recess in the end face of the support rod 20. At this time, the plunger abutment 21 is still spaced downwardly from the bottom end of the wire lead 11.

Next, the diode member 14 with its glass cylinder 15 held at its bottom is inserted into the tubular guide 19 until the annular edge of the open end of the glass cylinder 15 rests upon the top surface of the support rod 20 so that the upper and lower diode members 10 and 14 are temporarily held together on the apparatus as shown in FIG. 3 (2).

Under the circumstances, as the presser weight 18 is lowered, the conical recess in the bottom surface thereof comes to fit over the top end of the wire lead 16 of the member 14 to hold the latter in precise vertical alignment, as shown in FIG. 3 (3). However, the weight 18 applies its gravitational force solely upon the upper diode member 14 or upon the wire lead 16 and the glass cylinder 15 with some clearance left between the contact element 12 and the semiconductor metal pellet 17, since the upper diode member, specifically, the glass cylinder 15 still rests upon the top end surface of the support rod 20.

The support rod 20 is subsequently gradually lowered together with the two diode members 10 and 14 held in relative position as described above and descending under the gravitation of the presser weight 18 until the bottom end of the wire lead 11 of the diode member 10 is received in the conical recess in the top of the plunger abutment 21 so that the member 10 may not descend any further. At this time the diode member 10 is held in proper vertical alignment by the support rod 20 and plunger abutment 21 while the diode member 14 is held in proper vertical alignment by the tubular guide 19 and the presser weight 18, with the point of the contact element 12 held in contact with the end surface of the semiconductor metal pellet 17 at a predetermined contact point on said surface, as shown in FIG. 3 (4), the presser weight 19 giving a constant contacting pressure between the contact element and the semiconductor pellet 17.

Under these conditions, an appropriate heater device 22 such as a standard induction coil heater, is operated to heat the annular edge of the open end of the glass cylinder 15 and the glass bead 13 to fuse them together as shown in FIG. 3 (5) to complete the sealing operation the coil device 22 may be moved upwardly along support rod 20 to the position shown in FIG. 3 (4) for operation. Thereupon, the presser weight 18 is moved away so as not to hamper the unloading operation. Finally, the support rod 20 and the plunger abutment 21 are raised to push up the product through the tubular guide 19 for unloading the product.

It will be understood that the sealing procedure of the present invention as described above may be performed automatically by the mechanism illustrated or any other equivalent apparatus. It will be appreciated from the foregoing description that according to the present invention glass diodes having uniform characteristics can be manufactured with ease and at a high rate of production since the two component members of each glass diode are loaded with one of the members 10 carrying a contact element 12 disposed above the other member 14 and are held in vertical alignment under a predetermined amount of gravitational load so that at all times the end of the contact element 12 is brought into contact with the end surface of the semiconductor metal pellet 17 at a predetermined point on the surface and that at a constant contacting pressure.

What is claimed is:

A method of assembling a glass diode with a first diode member and a second diode member, the first diode member comprising a semiconductor metal pellet having a wire lead connected to the semiconductor metal pellet and a glass cylinder having a bottom through which the wire lead extends and to which the wire lead is sealed with the semiconductor metal pellet enclosed within the glass cylinder so that the distance between the surface of the semiconductor metal pellet opposite to the surface onto which the wire lead is connected and the open end face of the glass cylinder be a predetermined value, the second diode member comprising a wire lead carrying at one end a resilient contact element and a glass bead secured to the wire lead at a point adjacent to the contact element so that the distance between the free end of the contact element and the surface of the glass bead remote from the contact element be another predetermined value, the method comprising steps of receiving the second diode member on a vertical tubular rod with the free end of the contact element of the second diode element directed upwardly, receiving the first diode member on the vertical tubular rod with the open end face of the glass cylinder of the first diode member contacting with the upper face of the vertical tubular rod to have the glass cylinder cover the contact element with the upper end of the element being adjacent to the lower surface of the semiconductor metal pellet, placing a weight on the upper end of the wire lead of the first diode member, lowering the vertical tubular rod with the second and first diode element with the weight received on the tubular rod, abutting the second diode member after a predetermined depth of vertical travel of the vertical tubular rod so that the glass cylinder of the first diode member departs from the vertical tubular rod and the first diode member loaded by the weight is supported solely by the contact element, and then heating the glass cylinder with a heater means to seal the glass cylinder with the glass bead of the second diode member.

References Cited in the file of this patent

UNITED STATES PATENTS

| | | |
|---|---|---|
| 2,626,985 | Gates | Jan. 27, 1953 |
| 2,757,440 | Carman | Aug. 7, 1956 |
| 2,893,185 | Warren et al. | July 7, 1959 |
| 2,984,046 | Brewer | May 16, 1961 |
| 3,047,933 | Chick et al. | Aug. 7, 1962 |
| 3,094,766 | Hill | June 25, 1963 |
| 3,110,080 | Boyer | Nov. 12, 1963 |